Dec. 3, 1935.  W. W. STURDY  2,022,790

FREQUENCY INDICATING SYSTEM

Filed Aug. 24, 1933

INVENTOR
W. W. Sturdy
BY
ATTORNEY

Patented Dec. 3, 1935

2,022,790

UNITED STATES PATENT OFFICE 2,022,790

FREQUENCY INDICATING SYSTEM

William Werner Sturdy, Tarrytown, N. Y., assignor to American Telephone and Telegraph Company, a corporation of New York Application August 24, 1933, Serial No. 686,641

1 Claim. (Cl. 250—39)

This invention relates to transmission systems and particulaly to arrangements for indicating the frequency of currents or voltages supplied over transmission systems. More particularly, this invention relates to arrangements for indicating small changes in the frequency of impressed currents or voltages.

This application has particular reference to arrangements for indicating the frequency of alternation of a sinusoidal electric voltage. Each of the arrangements forming part of this invention presents one modification of the fundamental idea, which is to measure by means of a differentially connected vacuum tube voltmeter system the difference in voltage across two serially connected elements which are dissimilar in the relation between their impedance and the frequency of the impressed voltage. Inasmuch as the impedance of the resistance is independent of frequency and the impedances of capacitance and inductances vary inversely and proportionally, respectively, with frequency, in any combination of two of these three elements, namely, resistance, capacitance and inductance, the two elements will have equal voltage drops at only one frequency. It is a fact that by properly proportioning any two of these three elements, frequencies from a few cycles per second to millions of cycles per second may be readily measured.

Figure 1:
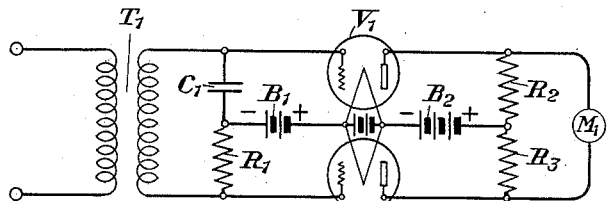
Figure 2:
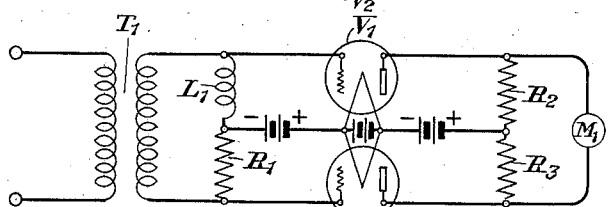
Figure 3:
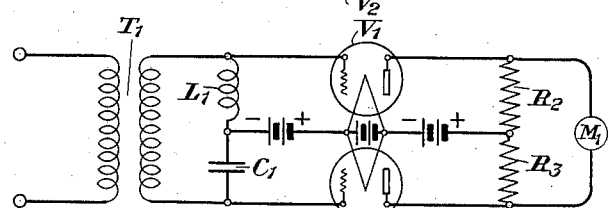
Figure 4:
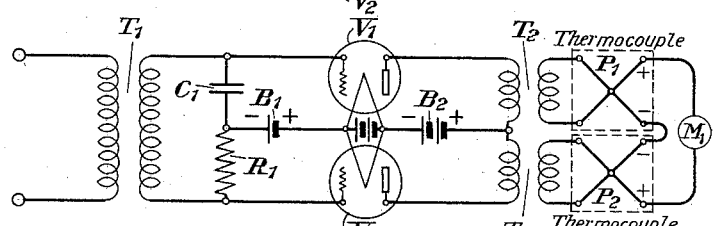
Figure 5:
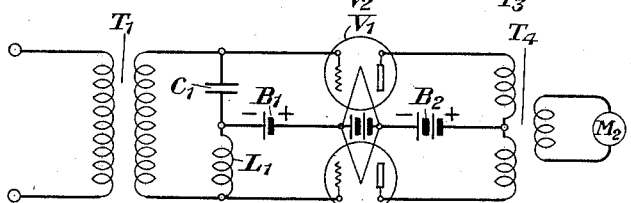
Figure 6:
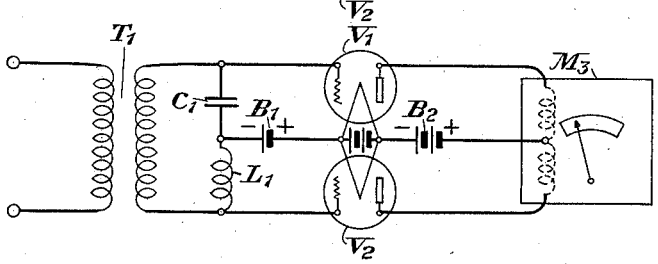

This invention will be better understood from the detailed description hereinafter following, when read in connection with the accompanying drawing, in which Figures 1, 2 and 3 show differentially connected vacuum tube systems operating as detectors in the output circuits of which resistances are connected and a measuring device bridges these resistances; Fig. 4 shows two differentially connected vacuum tubes acting as amplifiers to which are connected a pair of oppositely directed thermocouples through a pair of transformers, the thermocouples being arranged in series relationship with respect to a measuring device; Fig. 5 is another modification of the arrangement but in this arrangement a three winding transformer replaces the two transformers of Fig. 4, and the third winding is directly connected to a measuring device; and Fig. 6 represents still another modification of the invention, in which the coils of a differentially wound measuring device are connected in the plate circuits of two differentially connected vacuum tubes acting as amplifiers. All of these figures show different embodiments of the invention, as will be shown hereinafter.

Referring to Fig. 1 of the drawing, the reference character $T_1$ represents a transformer the primary winding of which is connected to a source of voltage, the frequency of which it is desired to measure. Some or all of the voltage of the source may be applied to the primary winding of this transformer. The secondary winding of the transformer $T_1$ transmits the impressed voltage across two elements, one of which is a condenser designated $C_1$ and the other a resistance designated $R_1$, these elements being connected in series relationship. Two three-element vacuum tubes designated $V_1$ and $V_2$ are so arranged that their grids are impressed with the voltages appearing across the terminals of the condenser $C_1$ and the resistance $R_1$, respectively. A battery $B_1$ of proper voltage is so poled that both the vacuum tubes $V_1$ and $V_2$ operate as detectors. It will be evident that the voltage appearing across the condenser $C_1$ will change the initial bias of the grid electrode of the tube $V_1$ and that the voltage appearing across the resistance $R_1$ will change the initial bias of the grid electrode of the tube $V_2$.

The plate circuits of the tubes $V_1$ and $V_2$ include resistances $R_2$ and $R_3$, respectively, and the common battery $B_2$. The resistances $R_2$ and $R_3$ are so proportioned that when the voltages appearing across the condenser $C_1$ and the resistance $R_1$ are equal, the voltages across resistances $R_2$ and $R_3$ will be equal. A direct current meter $M_1$ is connected in series with the resistances $R_2$ and $R_3$ and, under the conditions assumed, the meter $M_1$ will indicate no voltage. If, however, the voltage across the condenser $C_1$ becomes greater or less than the voltage across the resistance $R_1$, then the direct current voltage across the resistance $R_2$ will become greater or less, respectively, than the direct current voltage across the resistance $R_3$, and under these conditions the direct current meter $M_1$ will indicate a reading either on the negative or opposite side, respectively, of its scale.

In order to determine an unknown frequency, it will be necessary that the resistances $R_2$ and $R_3$ be adjusted as indicated hereinabove. The condenser $C_1$ and the resistance $R_1$ will also have to be adjusted so that upon the impression of a predetermined frequency, the pointer of the meter $M_1$ will indicate a zero reading. If the magnitude of the resistance $R_1$ and the impedance of the condenser $C_1$ are both known, the unknown frequency may be calculated or, if desired, either the condenser $C_1$ or the resistance $R_1$ may be calibrated to read frequency directly.

It will be apparent that when the arrangement is set up so that upon the impression of a given frequency the meter $M_1$ indicates a zero reading, a positive or negative reading upon the scale of the meter $M_1$ will indicate a frequency respectively lower or higher than the given frequency, and the lower or higher the reading the greater the departure of the impressed frequency from the given frequency.

It will be understood that the voltages impressed across the condenser $C_1$ and the resistance $R_1$ merely change the bias of the grid electrodes with respect to the filaments of the tubes $V_1$ and $V_2$, respectively. As the bias of the grid electrodes of these tubes becomes changed, the magnitudes of the direct currents flowing from battery $B_2$ through the resistances $R_2$ and $R_3$ will change by corresponding amounts and the voltages set up across the latter resistances will determine the direction of movement of the pointer of the meter $M_1$.

Fig. 2 shows an arrangement similar to the one set forth in Fig. 1 except that a winding or inductance $L_1$ has replaced the condenser or capacitance $C_1$. The principle of operation is is the same as described hereinabove for Fig. 1, but a reading on the positive side of the scale of the meter $M_1$ will indicate a frequency higher than that for which the apparatus was initially adjusted and a reading on the negative side of the scale will indicate a frequency lower than that present during the initial adjustment of the apparatus.

Fig. 3 shows another modification of the arrangement of this invention in which a condenser or capacitance $C_1$ has been substituted for the resistance $R_1$ of Fig. 2. The effect of using an inductance $L_1$ and a capacitance $C_1$ in series with each other instead of the combinations previously described with respect to Figs. 1 and 2, both of which include a series element of resistance, is to increase the sensitivity of the meter $M_1$ in determining and measuring impressed frequencies. In the arrangement shown in Fig. 3, a given change of frequency will produce approximately twice as great a deflection upon the scale of the meter $M_1$.

Fig. 4 shows the secondary winding of the transformer $T_1$ connected across the series elements of capacitance $C_1$ and resistance $R_1$, as in the case of Fig. 1. The vacuum tubes $V_1$ and $V_2$ are, however, biased by the battery $B_1$ so that they may operate upon the straight line portion of their characteristic curves, or in other words, they operate as amplifiers. The plate circuits of the tubes $V_1$ and $V_2$ include the primary windings of transformers $T_2$ and $T_3$ and the secondary windings of these transformers are connected to thermocouples $P_1$ and $P_2$, respectively. This arrangement prevents the direct current components of the currents flowing in the place circuits of the tubes $V_1$ and $V_2$ from becoming impressed upon the heating elements of the thermocouples $P_1$ and $P_2$.

The thermal junction elements of the thermocouples $P_1$ and $P_2$ are differentially connected to the meter $M_1$. Hence the meter $M_1$ reads the difference between the thermal electromotive forces of the thermocouples $P_1$ and $P_2$. It will be apparent that the elements of the two thermocouples may be adjusted in any manner well known in the art so that when the voltages impressed across the condenser $C_1$ and the resistance $R_1$ are equal, the thermal electromotive forces appearing at the thermal junction elements of the thermocouples $P_1$ and $P_2$ will be equal. Under these conditions, the pointer of the meter $M_1$ will remain at its mid-position. However, increases or dereases in the frequency of the voltages appearing across the condenser $C_1$ and the resistance $R_1$ will produce, respectively, negative and positive readings on the scale of the meter $M_1$ in the same manner as described hereinabove in connection with Fig. 1.

It will be evident that the series circuit including the condenser or capacitance $C_1$ and the resistance $R_1$ of the arrangement of Fig. 4 may be replaced by the series elements of inductance $L_1$ and resistance $R_1$ shown in Fig. 2 or by the series elements of inductance $L_1$ and capacitance $C_1$ shown in Fig. 3, and when these replacements are made, the arrangement of Fig. 4 will operate as described hereinabove in connection with Figs. 2 and 3, respectively.

In Fig. 5 the vacuum tubes $V_1$ and $V_2$ are so arranged that the battery $B_1$ causes these tubes to act as amplifiers. In this arrangement, however, a single transformer $T_4$ is employed instead of the two transformers shown in Fig. 4. The transformer $T_4$, however, has three windings, two of which are equal. The two equal windings are connected in series relationship in the plate circuits of tubes $V_1$ and $V_2$, respectively. The third winding is connected to an alternating current meter $M_2$.

In the arrangement shown in Fig. 5, the alternating current component of the plate current of the tube $V_1$ which flows through one of the two equal windings of the transformer $T_4$ produces a core magnetizing force opposite in phase to that produced by the alternating current component of the plate current of the tube $V_2$ which flows through the other of the equal windings of the transformer $T_4$. Means well known in the art may be provided for adjusting the alternating current components of the plate currents flowing through the tubes $V_1$ and $V_2$ so that, when the voltages impressed across the condenser $C_1$ and the winding or inductance $L_1$ are equal, the magnetizing forces produced by these alternating current components will be equal in magnitude and 180 degrees out of phase with each other. Under such conditions, the alternating current meter $M_2$ will move its pointer to the zero position. Changes in the frequency of the voltage impressed across the condenser $C_1$ or the winding or inductance element $L_1$ will change the deflection of the pointer of the meter $M_2$ and the magnitude of the deflection will correspond to the magnitude of the change in the impressed frequency. It will be noted, however, that the meter $M_2$ will be unable to indicate the direction of the change in frequency, that is, whether the impressed frequency has become increased or reduced, but this condition may be obviated by substituting for the alternating current meter $M_2$ a meter of the watt meter type having one of its coils connected to the input of the indicating apparatus.

Fig. 6 shows an arrangement similar to the one set forth in Fig. 5 except that that the plate currents of the tubes $V_1$ and $V_2$, instead of passing through the windings of the transformer, are transmitted directly through two differentially connected field windings and the armature coils of an alternating current dynamometer type of meter of well known construction. The alternating current components of the plate currents of the tubes $V_1$ and $V_2$, if equal in magnitude and in the same phase, will cause the pointer of the meter $M_3$ to move to its zero or mid-position. In this arrangement the meter $M_3$ will plainly indicate whether the frequency of the voltage impressed across the condenser $C_1$ and the winding or inductance $L_1$ has increased or decreased beyond that for which the arrangement was initially adjusted with respect to a predetermined frequency.

In the arrangements described hereinabove it has been assumed that the voltage applied to each of the circuits was sinusoidal in character. However, a non-sinusoidal voltage may be applied to the circuits shown in Figs. 1, 2, 3, and 4, and the pointer of the meter $M_1$ will still show whether a change in frequency has occurred and it will further show the direction in which the change in frequency has occurred.

These circuits may not, however, be used for the measurement of an unknown frequency of non-sinusoidal character. If it is desired to measure the fundamental or any one of the harmonics of a non-sinusoidal voltage or of any of its frequency components whether harmonically related to a fundamental or not, it will be necessary to insert a filter which is of well known construction between the source of voltage to be investigated and the input terminals of the transformer $T_1$. By the addition of such a filter, any one of the circuits shown in the drawing of this invention may be used either to determine the absolute value of the impressed frequency or the relative magnitude of the impressed frequency with respect to some arbitrary or determined frequency for which the apparatus was initially adjusted.

While this invention has been shown and described in certain particular arrangements merely for the purpose of illustration, it will be understood that the general principles of this invention may be applied to other and widely varied organizations without departing from the spirit of the invention and the scope of the appended claim.

What is claimed is:

A frequency measuring system for indicating the instantaneous frequency of applied alternating current comprising two series connected devices having different impedance-frequency characteristics, two vacuum tube amplifiers acting on the straight line portions of their characteristics, the grid circuits of which include said devices respectively, and a dynamometric instrument including a moving element and two coils connected in the respective plate circuits of the amplifiers, said coils receiving alternating current voltages from their respective amplifiers, said alternating current voltages simultaneously and conjointly acting upon and controlling the relative movements of said element of the instrument.

WILLIAM W. STURDY.